United States Patent
Zhang et al.

(10) Patent No.: US 9,581,368 B2
(45) Date of Patent: Feb. 28, 2017

(54) AUTOMOBILE AIR-CONDITIONING SYSTEM

(75) Inventors: Rongrong Zhang, Hangzhou (CN); Edwin J. Stanke, Hangzhou (CN); Longzhou Xu, Hangzhou (CN)

(73) Assignee: Hangzhou Sanhua Research Institute Co., Ltd., Hangzhou, Zhejiang (CN)

(*) Notice: Subject to any disclaimer, the term of this patent is extended or adjusted under 35 U.S.C. 154(b) by 471 days.

(21) Appl. No.: 14/123,748

(22) PCT Filed: Jun. 6, 2012

(86) PCT No.: PCT/CN2012/076529
§ 371 (c)(1),
(2), (4) Date: Dec. 3, 2013

(87) PCT Pub. No.: WO2012/167726
PCT Pub. Date: Dec. 13, 2012

(65) Prior Publication Data
US 2014/0123698 A1   May 8, 2014

(30) Foreign Application Priority Data
Jun. 9, 2011  (CN) .......................... 2011 1 0161555

(51) Int. Cl.
*F25B 41/06* (2006.01)
*F25B 39/02* (2006.01)
*B60H 1/32* (2006.01)

(52) U.S. Cl.
CPC ............ *F25B 39/02* (2013.01); *B60H 1/3229* (2013.01); *F25B 41/062* (2013.01); *F25B 2400/05* (2013.01)

(58) Field of Classification Search
CPC ........ F25B 41/04; F25B 41/06; F25B 41/062; F25B 2400/052; F25B 2400/05;
(Continued)

(56) References Cited

U.S. PATENT DOCUMENTS

| | | | | |
|---|---|---|---|---|
| 5,653,119 | A | * | 8/1997 | Kimura ................ B60H 1/3222 62/197 |
| 5,715,705 | A | * | 2/1998 | Kujirai ............... B60H 1/00485 62/225 |
| 2010/0328004 | A1 | * | 12/2010 | Wei .......................... H01F 5/04 336/96 |

FOREIGN PATENT DOCUMENTS

| | | |
|---|---|---|
| CN | 1598445 A | 3/2005 |
| CN | 1763451 A | 4/2006 |

(Continued)

OTHER PUBLICATIONS

International Search Report dated Aug. 23, 2012 from corresponding International Application No. PCT/CN2012/076529.
(Continued)

*Primary Examiner* — Orlando E Aviles Bosques
(74) *Attorney, Agent, or Firm* — Wolf, Greenfield & Sacks, P.C.

(57) ABSTRACT

An automobile air-conditioning system is provided, which includes an evaporator and an electrical expansion valve in communication via pipes, with the electrical expansion valve including a coil and a valve body, the coil being fixedly mounted on the valve body; the system also includes a support, the support including a heat-sinking bridge and a cooling ring, with the evaporator provided on one side of the heat-sinking bridge and the cooling ring provided on the other side of the heat-sinking bridge; the heat-sinking bridge and the cooling ring are formed in one piece or are connected with each other fixedly, and the coil is provided within the cooling ring. The automobile air-conditioning system has the advantages of a compact structural design, is capable of effectively cooling the electrical expansion valve, and has high system strength, stable transmission of coolant, and high security.

16 Claims, 12 Drawing Sheets

(58) Field of Classification Search
CPC .............. F25B 39/02; F25B 2600/2511; F25B 2600/2513; B60H 1/3229; F16K 49/00
See application file for complete search history.

(56) References Cited

FOREIGN PATENT DOCUMENTS

| | | |
|---|---|---|
| CN | 201281502 Y | 7/2009 |
| CN | 201429257 Y | 3/2010 |
| CN | 201488398 U | 5/2010 |
| CN | 102026527 A | 4/2011 |
| JP | 2004245480 A | 9/2004 |

OTHER PUBLICATIONS

Chinese Office Action, dated May 20, 2015, from corresponding Chinese Application No. 201110161555.0.

* cited by examiner

AUTOMOBILE AIR-CONDITIONING SYSTEM

The present application is the national phase of International Application No. PCT/CN2012/076529, filed on Jun. 6, 2012, which claims the benefit of priority to Chinese patent application No. 201110161555.0, filed with the Chinese State Intellectual Property Office on Jun. 9, 2011, which applications are hereby incorporated by reference to the maximum extent allowable by law.

TECHNICAL FIELD

The present application relates to a technical field of air conditioning, in particular to an air-conditioning system used in an automobile.

BACKGROUND

Energy saving of an automobile air-conditioning system appears to be quite important as the requirement for the automobile energy saving becomes increasingly higher. In a conventional automobile air-conditioning system, a throttle mechanism generally includes a thermal expansion valve and a throttling short tube. Compared to the conventional throttle mechanism, the electronic expansion valve has a relatively strong advantage in overheat control and overall energy saving since the electronic expansion valve may realize an accurate control.

However, there are some limitations for the application of the electronic expansion valve in the automobile air conditioner, and one main factor is that the electronic expansion valve is an electric component and is difficult to meet a requirement for temperature resistance of the automobile environment. An overly high operating environment temperature may burn and damage the coil of the electronic expansion valve and the control chip, thus the electronic expansion valve cannot work normally, which may in turn affect the operation of the whole air-conditioning system. In order to enhance the level of the temperature resistance of the electronic expansion valve, the volume of the electronic expansion valve must be increased, however the increased volume may not only increase the cost, but also fail to show the application advantages of the electronic expansion valve.

At present, due to the price factor and the technical bottleneck of the electronic expansion valve, the thermal expansion valve is also applied in the new energy automobile air conditioner as well as the conventional gasoline car. Due to influences from factors of weather, road condition, thermal load, engine speed and etc., an automobile air conditioner generally works under a non-standard design working condition. However, the set value of an overheat degree of the thermal expansion valve is set according to a standard working condition. When the system is operated under a non-standard working condition, the overheat degree tends to deviate from the set value of the overheat degree, thereby causing the decrease of the system efficiency and an unstable operation, and causing dew formation or even frost formation on the evaporator under a certain condition.

In an air-conditioning system of an electric automobile, an electronic expansion valve is required to cooperate with a varying speed adjustment of a variable volume electrical compressor. Especially, the electrical compressor works independently in the air-conditioning system of the electric automobile, which is different from that in the gasoline car that the compressor is driven by an engine belt pulley. However, a flow adjusting characteristic of the thermal expansion valve cannot be combined with a frequency conversion characteristic of the electrical compressor, which results in a large power load, and a low travel distance per charge of the electric automobile.

Therefore, the application of the electronic expansion valve in the automobile air-conditioning field appears to be extremely important.

SUMMARY

An object of the present application is to provide an automobile air-conditioning system to solve the defect in the prior art that the electronic expansion valve is difficult to meet the requirement for temperature resistance of the automobile environment, and the automobile air-conditioning system has a compact structural design, may effectively cool the electronic expansion valve, and has a high system strength, a stable transmission of refrigerant and a high security.

In order to solve the defect in the prior art, an automobile air-conditioning system is provided, which includes an evaporator and an electronic expansion valve which are communicated with each other via a pipeline, the electronic expansion valve including a coil and a valve body, and the coil being fixedly mounted on the valve body, wherein the automobile air-conditioning system further includes a bracket, the bracket includes a heat dissipation bridge and a cooling ring, the evaporator is arranged at one side of the heat dissipation bridge, the cooling ring is arranged at the other side of the heat dissipation bridge, the heat dissipation bridge and the cooling ring are integrally formed or are fixedly connected, and the coil is arranged in the cooling ring.

Preferably, the side of the heat dissipation bridge close to the evaporator is in direct contact with the evaporator.

Preferably, the side of the heat dissipation bridge close to the evaporator and the evaporator are fixedly connected to be in direct contact with one another.

Preferably, the coil is in direct contact with the cooling ring.

Preferably, the coil and the cooling ring are fixedly connected to be in direct contact with one another.

Preferably, a cover configured to enclose the coil is arranged on the cooling ring, and the cover and the cooling ring are integrally formed or are fixedly connected.

Preferably, the cover has no opening and completely encloses a top portion of the coil, or the cover has an opening and partially encloses a top portion of the coil.

Preferably, the cooling ring is of a complete ring body structure.

Preferably, the cooling ring has a gap, the cooling ring having the gap includes two connecting ends, the two connecting ends are two ring body extending portions extending outwardly from end portions of a ring body at the gap and arranged opposite to each other, and the two connecting ends are fixedly connected via a bolt.

Preferably, the bracket further includes a connecting plate, the connecting plate is arranged between the evaporator and the electronic expansion valve, the heat dissipation bridge is arranged at one side of the connecting plate close to the electronic expansion valve, and the heat dissipation bridge and the connecting plate are integrally formed or are fixedly connected.

Preferably, the side of the connecting plate close to the evaporator is in direct contact with the evaporator.

Preferably, the side of the connecting plate close to the evaporator and the evaporator are fixedly connected to be in direct contact with one another.

Preferably, the side of the connecting plate close to the evaporator is fixedly connected to the evaporator by welding, and a welding surface is an entire contacting surface between the connecting plate and the evaporator, or a contacting surface between the evaporator and a position, corresponding to the heat dissipation bridge, at the side of the connecting plate close to the evaporator.

Preferably, the bracket further includes a base, the base is horizontally arranged at a bottom of the connecting plate, the connecting plate and the base are integrally formed or are fixedly connected, the base is fixedly mounted in automobile, and the evaporator and the electronic expansion valve are, respectively, located at two sides above the base.

Preferably, the evaporator is directly fixed on one side of an upper surface of the base, and the valve body of the electronic expansion valve is directly fixed on the other side of the upper surface of the base.

Preferably, the bracket further includes a first supporting board, the first supporting board is fixedly mounted on the side of the connecting plate close to the evaporator, and the evaporator is fixedly mounted on the first supporting board.

Preferably, the bracket further includes a second supporting board, the second supporting board is fixedly mounted on the side of the connecting plate close to the electronic expansion valve, and the valve body of the electronic expansion valve is fixedly mounted on the second supporting board.

The automobile air-conditioning system according to the present application has the following beneficial effects.

1) In the automobile air-conditioning system according to the present application, heat quantity from the electronic expansion valve may be rapidly transmitted to the evaporator via the heat dissipation bridge and the cooling ring, and the refrigerating capacity of the evaporator is effectively utilized to cool the electronic expansion valve, thereby effectively utilizing a cold source and reducing an energy waste. Further the level of the temperature resistance of the electronic expansion valve is not required to be improved, thereby saving cost and avoiding a valve failure caused when the electronic expansion valve is working under a nonstandard working condition.

2) The automobile air-conditioning system according to the present application further includes a cooling ring having a gap, and two ends of the gap are fixedly connected, such that the cooling ring and the electronic expansion valve are abutted against each other more tightly, thereby improving the heat transfer efficiency of the cooling ring.

3) The automobile air-conditioning system according to the present application further includes a cover arranged at the top of the coil and connected to the cooling ring so as to enclose the coil and further improving the heat transfer efficiency between the electronic expansion valve and the evaporator.

4) The automobile air-conditioning system according to the present application further includes a connecting plate arranged between the electronic expansion valve and the evaporator so as to improve the heat transfer efficiency between the electronic expansion valve and the evaporator.

5) In the automobile air-conditioning system according to the present application, the electronic expansion valve and the evaporator are fixedly mounted on the bracket, thereby further enhancing the overall structural strength of the automobile air conditioner.

6) In the automobile air-conditioning system according to the present application, the electronic expansion valve is fixedly mounted next to the evaporator, which realizes a well cooperation between the evaporator and the electronic expansion valve, shortens a connection pipeline between the evaporator and the electronic expansion valve, and enhances the capability of vibration resistance; and meanwhile the automobile air-conditioning system has a compact structure, the using space of the automobile air conditioner is effectively saved, and the overall structural strength of the automobile air-conditioning system is enhanced.

7) The structural design philosophy of fixedly mounting the electronic expansion valve next to the evaporator via a bracket to make the coil of the electronic expansion valve work under a standard working condition in the automobile air-conditioning system according to the present application may be applied in a traditional refrigerating system to provide a basis for realizing a comprehensive utilization of the energy of the refrigerating system.

DETAILED DESCRIPTION

In the automobile air-conditioning system according to the present application, heat from an electronic expansion valve is rapidly transferred to an evaporator through a bracket having a heat dissipation bridge and a cooling ring, and the refrigerating capacity of the evaporator is effectively utilized to cool the electronic expansion valve, thereby effectively utilizing a cold source and reducing an energy waste. Further the level of the temperature resistance of the electronic expansion valve is not required to be improved, thereby saving cost and avoiding a valve failure caused when the electronic expansion valve is working under a nonstandard working condition. Embodiments of an automobile air-conditioning system of the present application will be described in detail hereinafter in conjunction with the drawings.

Figure 1:
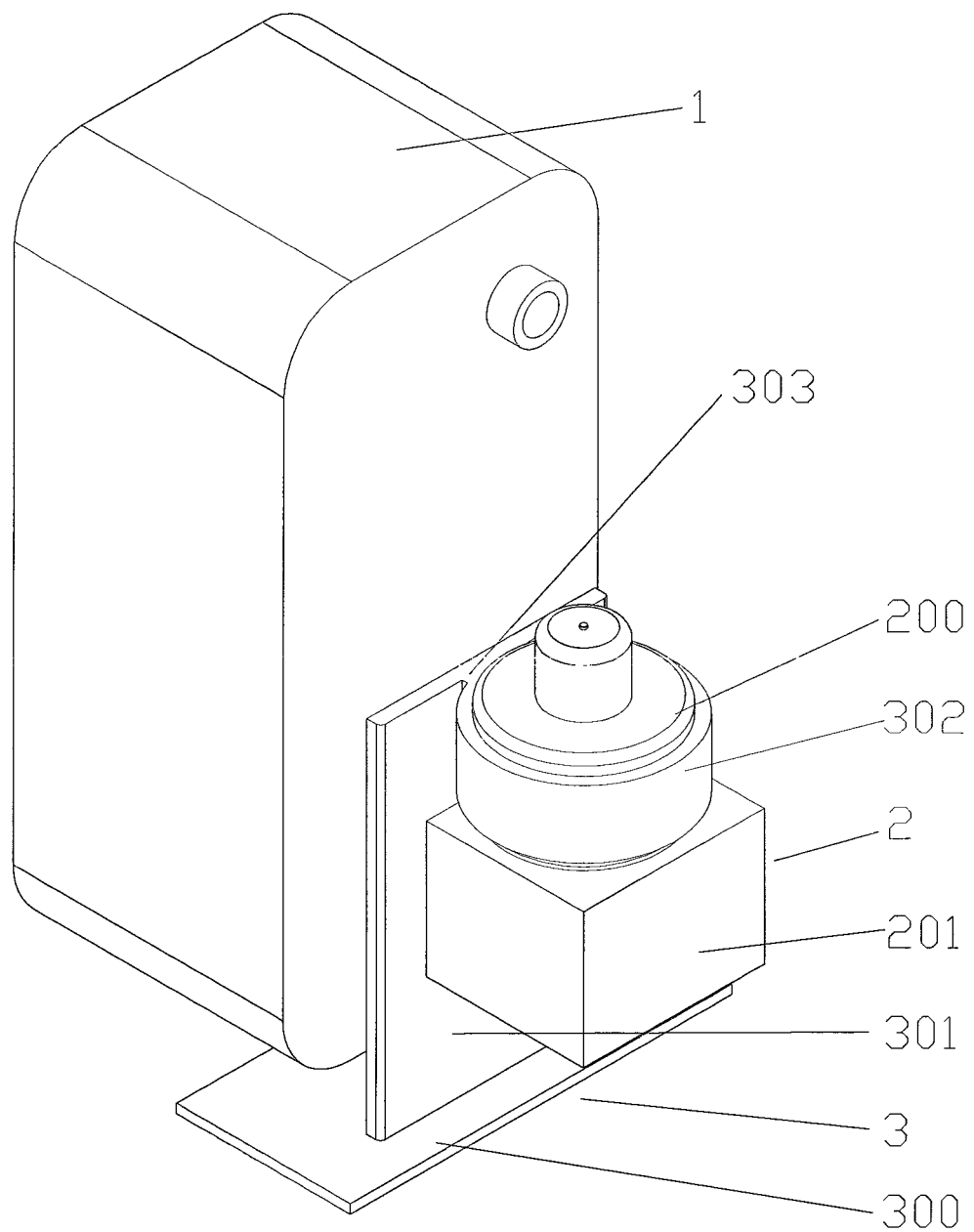
FIG. 1 is a perspective view of an automobile air-conditioning system according to an embodiment of the present application.

Reference is made to FIG. 1, which is a perspective view of an automobile air-conditioning system according to an embodiment of the present application. The automobile air-conditioning system includes an evaporator 1 and an electronic expansion valve 2 which are communicated with each other via a pipe, the electronic expansion valve 2 includes a coil 200 and a valve body 201, and the coil 200 is fixedly mounted on the valve body 201. The automobile air-conditioning system further includes a bracket 3, and the bracket 3 includes a base 300, a connecting plate 301, a heat dissipation bridge 303 and a cooling ring 302.

Figure 2:
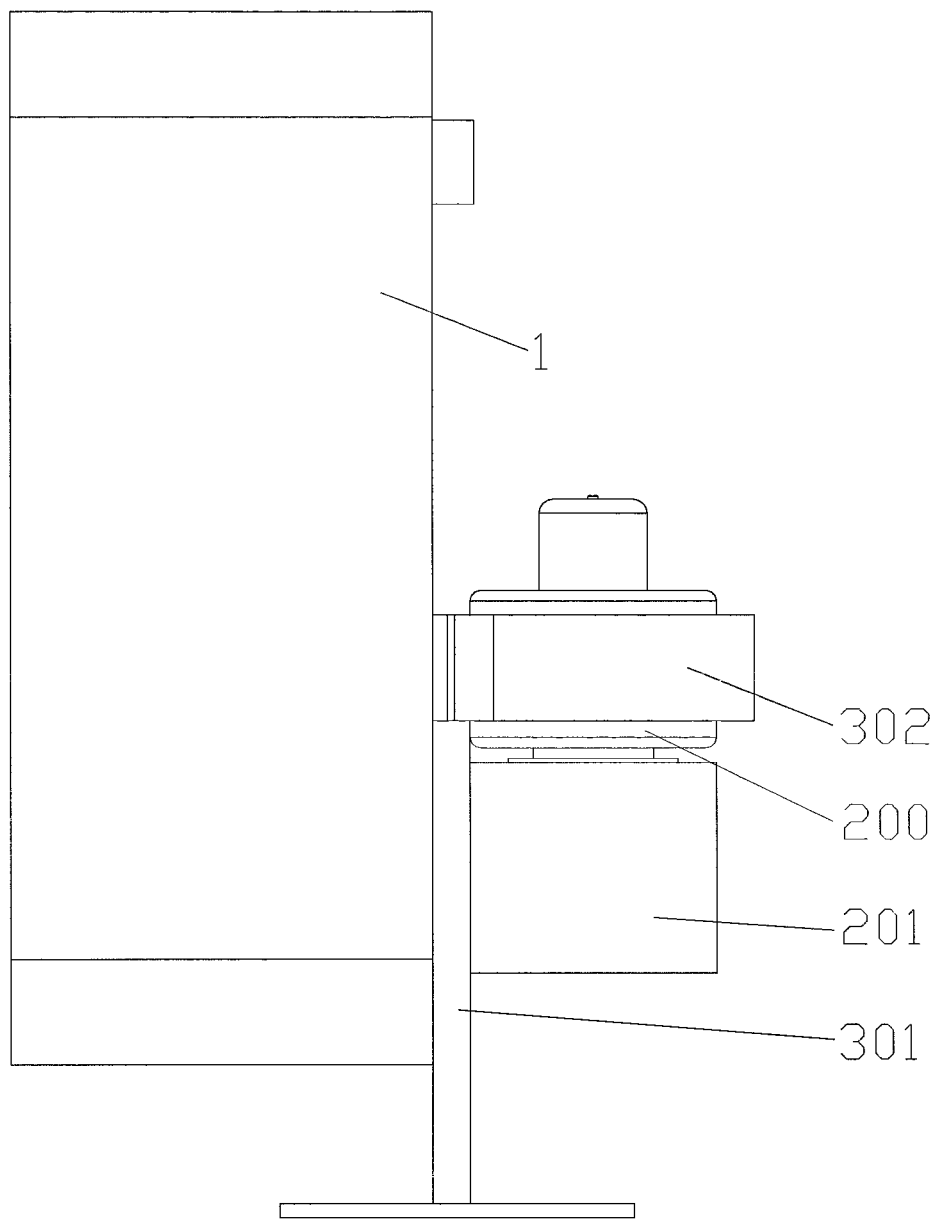
FIG. 2 is a left view of the automobile air-conditioning system of the embodiment shown in FIG. 1.

The evaporator 1 and the electronic expansion valve 2 are respectively arranged at two sides of the connecting plate 301, and the evaporator 1 is in direct contact with the connecting plate 301. Further, the evaporator 1 and the connecting plate 301 are fixedly connected to be in direct contact with one another. Contacting surfaces of the evaporator 1 and the connecting plate 301 may be fixedly connected by partially welding or wholly welding. As shown in FIG. 2, which is a left view of the automobile air-conditioning system of the embodiment shown in FIG. 1, the contacting surfaces of the connecting plate 301 and the evaporator 1 are connected by wholly welding.

The heat dissipation bridge 303 is arranged at a top of the connecting plate 301 at a side close to the electronic expansion valve 2, and the heat dissipation bridge 303 and the connecting plate 301 are fixedly connected or are formed integrally. It can be appreciated for those skilled in the art that, the heat dissipation bridge 303 may be arranged at any position on the connecting plate 301 at the side close to the electronic expansion valve 2.

The cooling ring 302 is of an annular structure, and the cooling ring 302 and the heat dissipation bridge 303 are fixedly connected or are formed integrally. The coil 200 of the electronic expansion valve 2 is arranged inside the cooling ring 302 and is surrounded by the cooling ring 302, wherein the coil 200 is in direct contact with the cooling ring 302. Further, the coil 200 and the cooling ring 302 are fixedly connected to be in direct contact with one another. In a case that the coil 200 is in direct contact with the cooling ring 302 but is not fixedly connected to the cooling ring 302, the valve body 201 and the connecting plate 301 are fixedly connected to fixedly connect the electronic expansion valve 2 to the connecting plate 301. In a case that the coil 200 and the cooling ring 302 are fixedly connected, the valve body 201 and the connecting plate 301 may be in direct contact with one another without being fixedly connected, or be arranged with a gap therebetween, or be fixedly connected.

The side of the heat dissipation bridge 303 close to the evaporator 1 is in direct contact with the evaporator 1, and the coil 200 is in direct contact with the cooling ring 302, thus heat generated by the coil 200 of the electronic expansion valve 2 may be transmitted to the evaporator 1 via the heat dissipation bridge 303 and the coil 200.

Further, the heat dissipation bridge 303 and the evaporator 1 are fixedly connected, and the coil 200 and the cooling ring 302 are fixedly connected, thereby not only improving a heat transfer efficiency between the electronic expansion valve 2 and the evaporator 1, but also making the structure of the automobile air-conditioning system more compact and improving the overall structural strength of the automobile air-conditioning system.

The base 300 is horizontally arranged at a bottom of the connecting plate 301, and the evaporator 1 and the electronic expansion valve 2 are, respectively, arranged at two sides above the base 300. The base 300 is fixedly mounted on the automobile, and the connecting plate 301 and the base 300 are integrally formed, or the connecting plate 301 and the base 300 are formed separately and the connecting plate 301 is fixedly mounted on the base 300.

In the above embodiments, the electronic expansion valve 2 is fixedly mounted on the bracket 3, and the bracket 3 is fixedly mounted in the automobile and is fixedly connected to the evaporator 1.

Further, the cooling ring 302 is fixedly mounted on the connecting plate 301 via the heat dissipation bridge 303, and the coil 200 of the electronic expansion valve 2 is fixedly mounted in the cooling ring 302. In this embodiment, the cooling ring 302 is of a complete annular structure. The connecting plate 301, the cooling ring 302 and the heat dissipation bridge 303 are formed integrally. Alternatively, the connecting plate 301, the cooling ring 302 and the heat dissipation bridge 303 may be formed separately.

According to another embodiment of the present application, the bracket 3 may only include the heat dissipation bridge 303, and the heat dissipation bridge 303 is arranged between the evaporator 1 and the electronic expansion valve 2. The electronic expansion valve 2 is in contact with the evaporator 1 via the heat dissipation bridge 303 to transmit heat. Further, the coil 200 of the electronic expansion valve 2 is in contact with the evaporator 1 via the heat dissipation bridge 303 to transmit heat.

Figure 3:
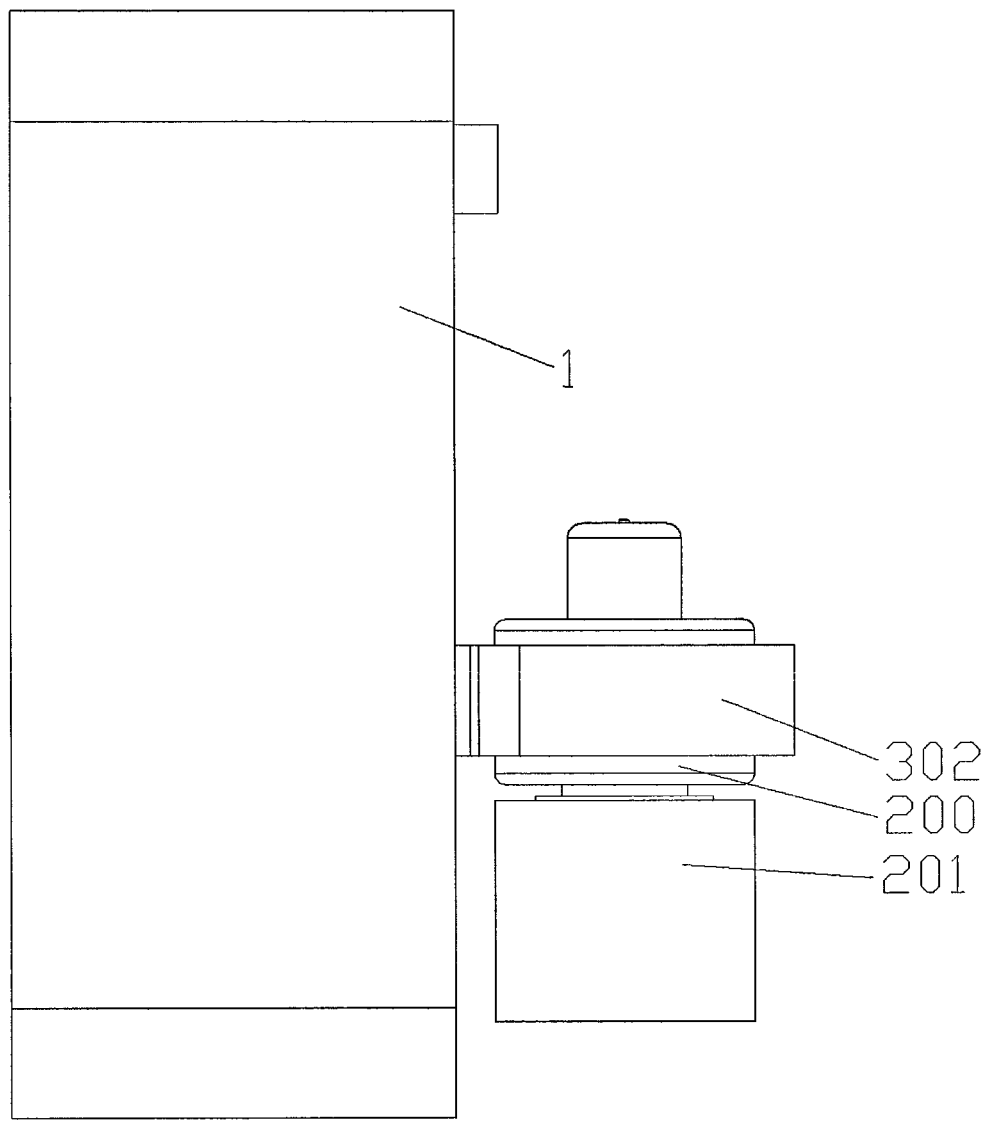
FIG. 3 is a left view of an automobile air-conditioning system according to another embodiment of the present application.

Reference is made to FIG. 3, which is a left view of an automobile air-conditioning system according to another embodiment of the present application. The bracket 3 may only include the heat dissipation bridge 303 and the cooling ring 302, and the heat dissipation bridge 303 and the cooling ring 302 are arranged between the evaporator 1 and the electronic expansion valve 2. The heat dissipation bridge 303 has one side in contact with the evaporator 1 and the other side connected with the cooling ring 302 having a gap. The electronic expansion valve 2 is in contact with the cooling ring 302 and transmits heat to the evaporator 1 via the cooling ring 302 and the heat dissipation bridge 303.

The heat dissipation bridge 303 has one side fixedly connected to the evaporator 1 and the other side fixedly connected to the cooling ring 302 having the gap, and the electronic expansion valve 2 is fixedly mounted on the cooling ring 302. The coil 200 of the electronic expansion valve 2 is fixedly mounted inside the cooling ring 302, such that heat from the coil 200 of the electronic expansion valve 2 may be transmitted to the evaporator 1 via the cooling ring 302 and the heat dissipation bridge 303.

The heat dissipation bridge 303 and the cooling ring 302 may be formed integrally or separately. In a case that the heat dissipation bridge 303 and the cooling ring 302 are formed separately, the heat dissipation bridge 303 and the cooling ring 302 are fixedly connected, and the fixed connection may be realized by welding, threaded connection, clamping connection and etc. The evaporator 1 is directly fixed on the automobile, and the electronic expansion valve 2 is fixedly connected to the evaporator 1 via the cooling ring 302 and the heat dissipation bridge 303, thereby making the structure of the automobile air-conditioning system more compact.

Unlike the embodiment in FIG. 1, in this embodiment, the coil 200 and the cooling ring 302 are fixedly connected, the heat dissipation bridge 303 and the evaporator 1 are fixedly connected, and the evaporator 1 is directly mounted in the automobile, thereby shortening the connecting pipe between the evaporator 1 and the electronic expansion valve 2, enhancing the vibration resistance, and meanwhile making the structure of the automobile air-conditioning system compact, effectively saving the usage space of the automobile air conditioner, and improving the overall structural strength of the automobile air conditioner.

Figure 4:
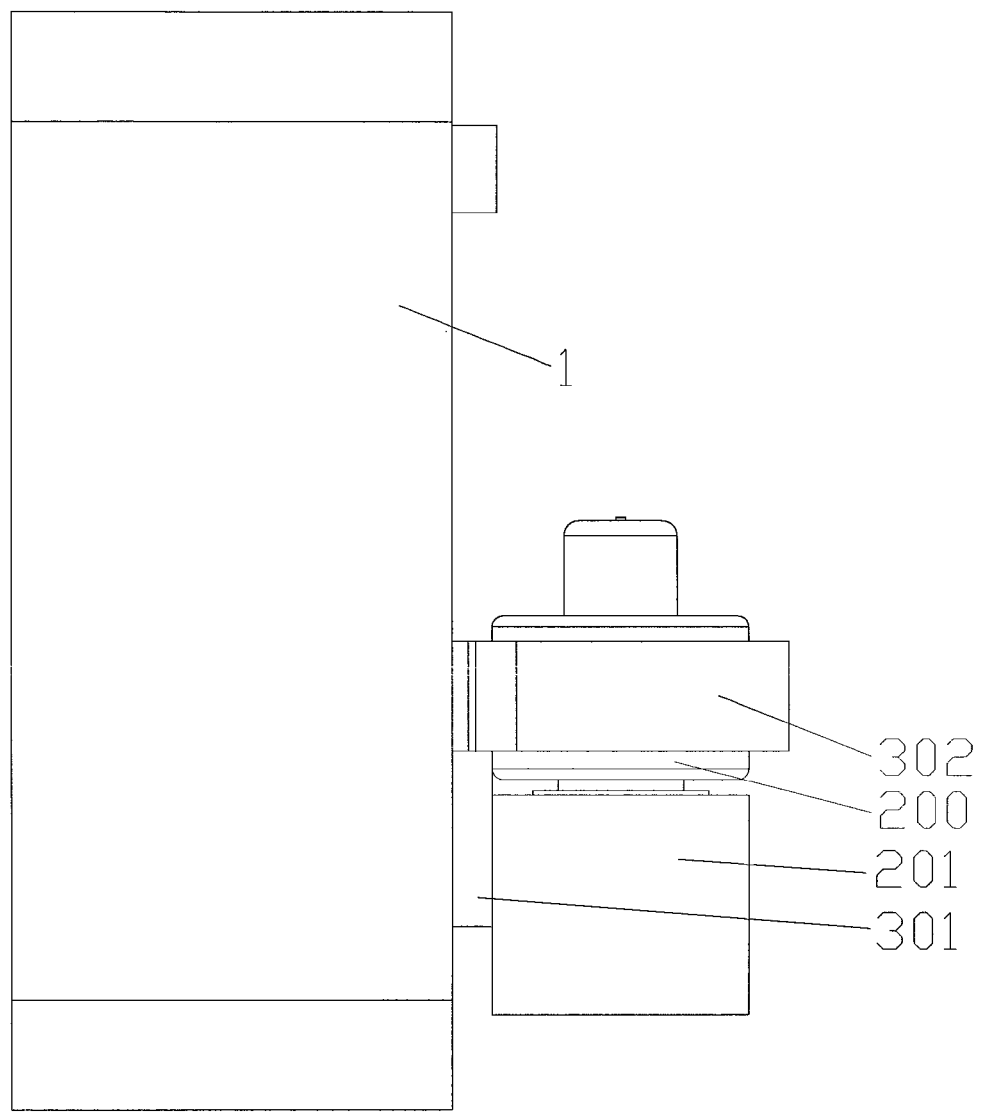
FIG. 4 is a left view of an automobile air-conditioning system according to another embodiment of the present application.

According to another embodiment of the present application, the bracket 3 may only include the heat dissipation bridge 303, the cooling ring 302 and the connecting plate 301. Reference is made to FIG. 4, which is a left view of an automobile air-conditioning system according to the embodiment of the present application. The evaporator 1 is fixedly mounted in the automobile in practical use, and the connecting plate 301 has one plane in direct contact with the evaporator 1 and another plane fixedly arranged with the electronic expansion valve. Contacting planes of the connecting plate 301 and the evaporator 1 may also be partially welded.

Figure 5:
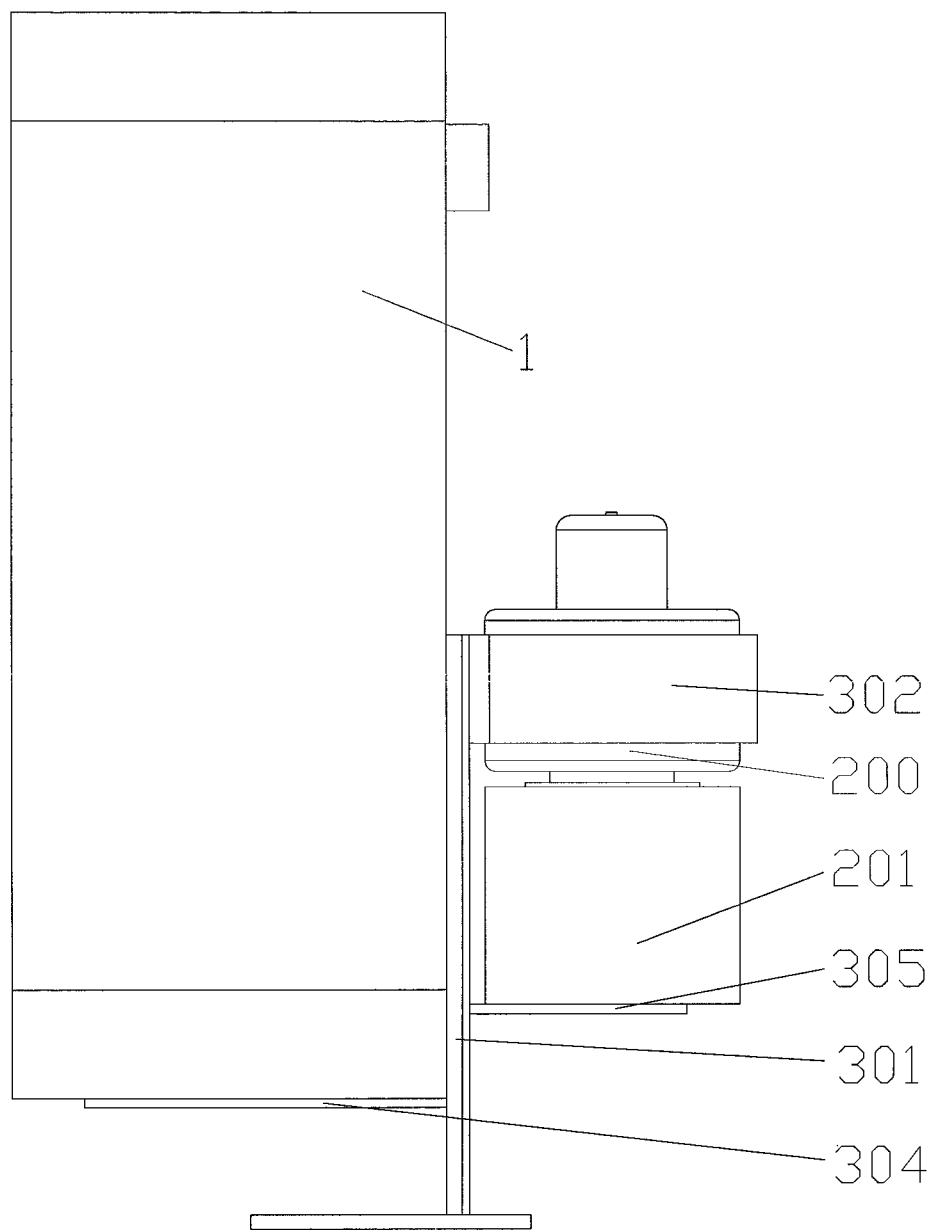
FIG. 5 is a left view of an automobile air-conditioning system according to another embodiment of the present application.

Reference is made to FIG. 5, which is a left view of an automobile air-conditioning system according to another embodiment of the present application. Unlike the embodiment shown in FIG. 1, in this embodiment, besides the heat dissipation bridge 303, the cooling ring 302 and the connecting plate 301, the bracket 3 further includes a first supporting board 304 and a second supporting board 305 which are respectively mounted on two planes at two sides of the connecting plate.

The first supporting board 304 is fixedly mounted at the side of the connecting plate 301 close to the evaporator 1 and is located below the evaporator 1, and the evaporator 1 is fixedly mounted on the first supporting board 304.

The second supporting board 305 is fixedly mounted at the side of the connecting plate 301 close to the electronic expansion valve 2 and is located below the cooling ring 302, and the valve body 201 of the electronic expansion valve 2 is fixedly mounted on the second supporting board 305.

Other structures of the present embodiment are the same as the first embodiment. In this embodiment, the connecting plate 301 and the evaporator 1 may be in direct contact with one another, or the contacting surfaces thereof may be wholly welded. Only one of the first supporting board 304 and the second supporting board 305 may be mounted, for example, in a case that the first supporting board 304 is not provided, the connecting plate 301 and the evaporator 1 may be directly connected by welding; and similarly, in a case that the second supporting board 305 is not provided, the connecting plate 301 and the electronic expansion valve 2 may be directly connected by welding.

The connecting plate 301, the first supporting board 304 and the second supporting board 305 may not only strengthen the automobile air-conditioning system, but also accelerate the heat transfer between the electronic expansion valve 2 and the evaporator 1.

Figure 6:
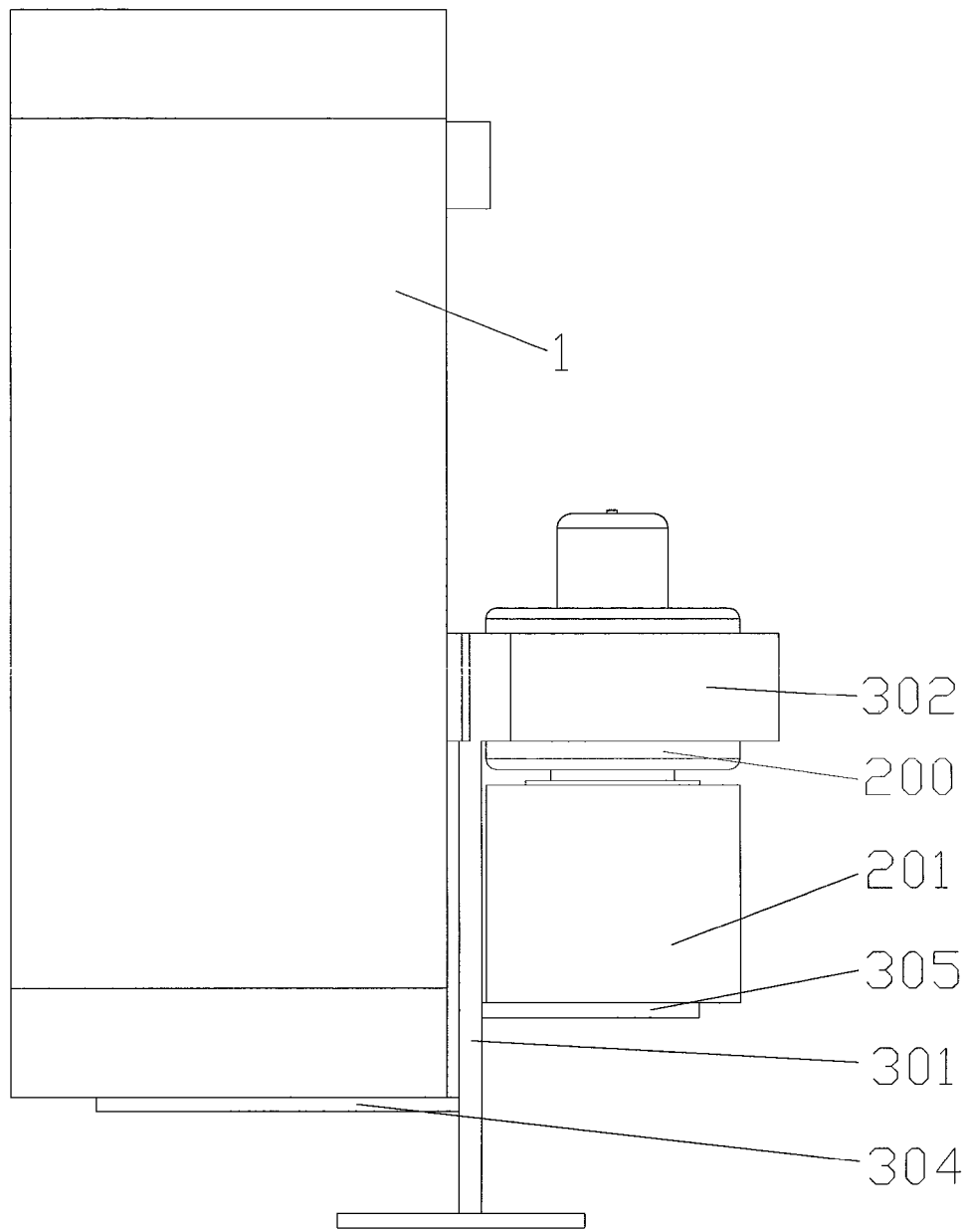
FIG. 6 is a perspective view of an automobile air-conditioning system according to another embodiment of the present application.

Reference is made to FIG. 6, which is a perspective view of an automobile air-conditioning system according to another embodiment of the present application. Unlike the embodiment shown in FIG. 5, in this embodiment, the connecting plate 301 and the evaporator 1 are partially welded or are in contact with one another partially, for example, the side of the connecting plate 301 close to the evaporator 1 is welded to the evaporator 1 at a position corresponding to the heat dissipation bridge 303.

Figure 7:
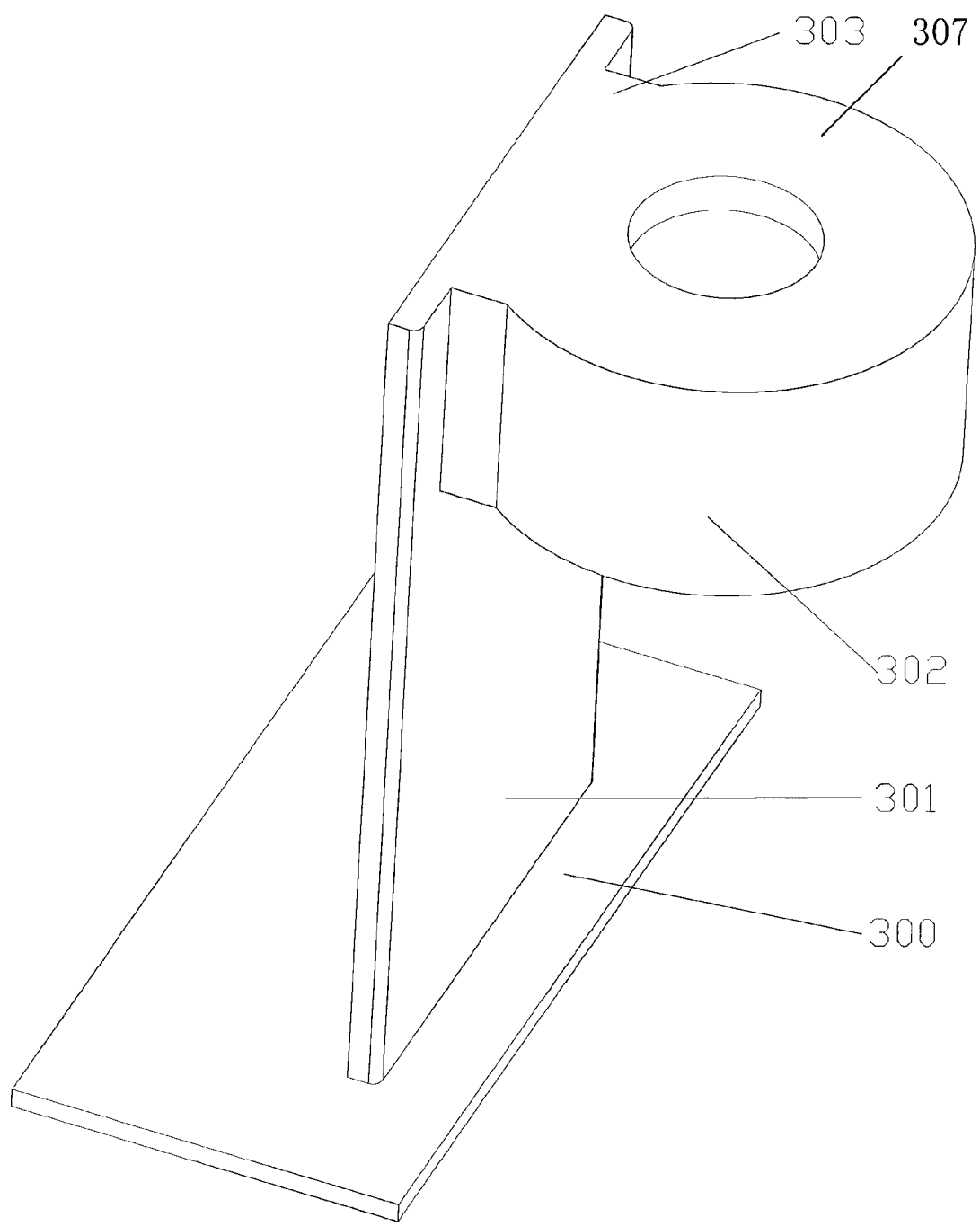
FIG. 7 is a perspective view of a bracket of an automobile air-conditioning system according to another embodiment of the present application.

Reference is made to FIG. 7, which is a perspective view of the bracket according to another embodiment of an automobile air-conditioning system in the present application. To strengthen the cooling effect, a cover 307 having an opening may be further arranged on the cooling ring 302 at the top of the coil 200 to enclose the coil 200, and the cover 307 is connected to the cooling ring 302. The cover 307 on the cooling ring 302 may be sealed or may have an opening.

Figure 8:
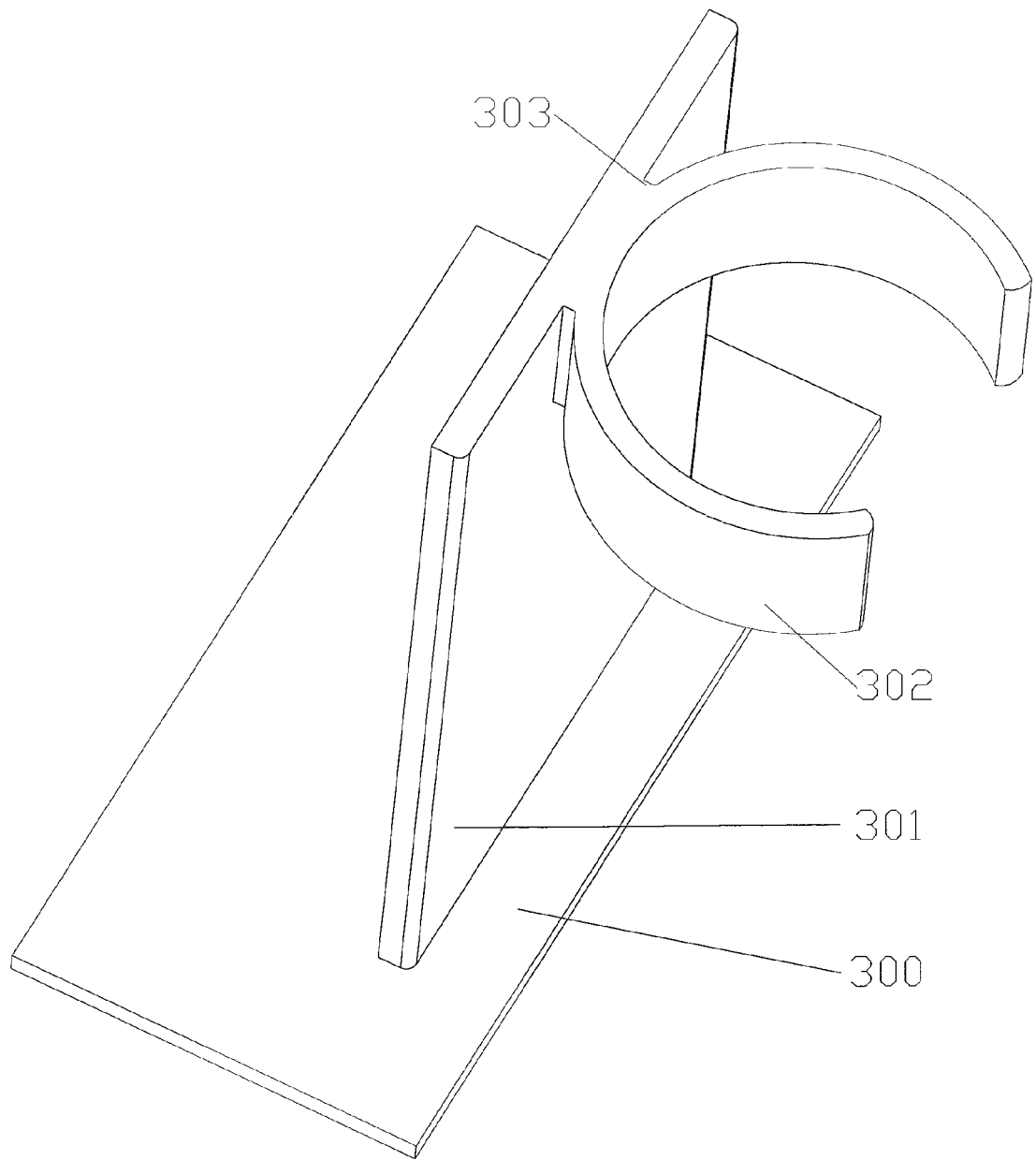
FIG. 8 is a perspective view of a bracket of an automobile air-conditioning system according to another embodiment of the present application.

Reference is made to FIG. 8, which is a perspective view of the bracket according to another embodiment of an automobile air-conditioning system in the present application. The cooling ring 302 has a gap, and such cooling ring 302 having the gap may facilitate the installation of the electronic expansion valve.

Figure 9:
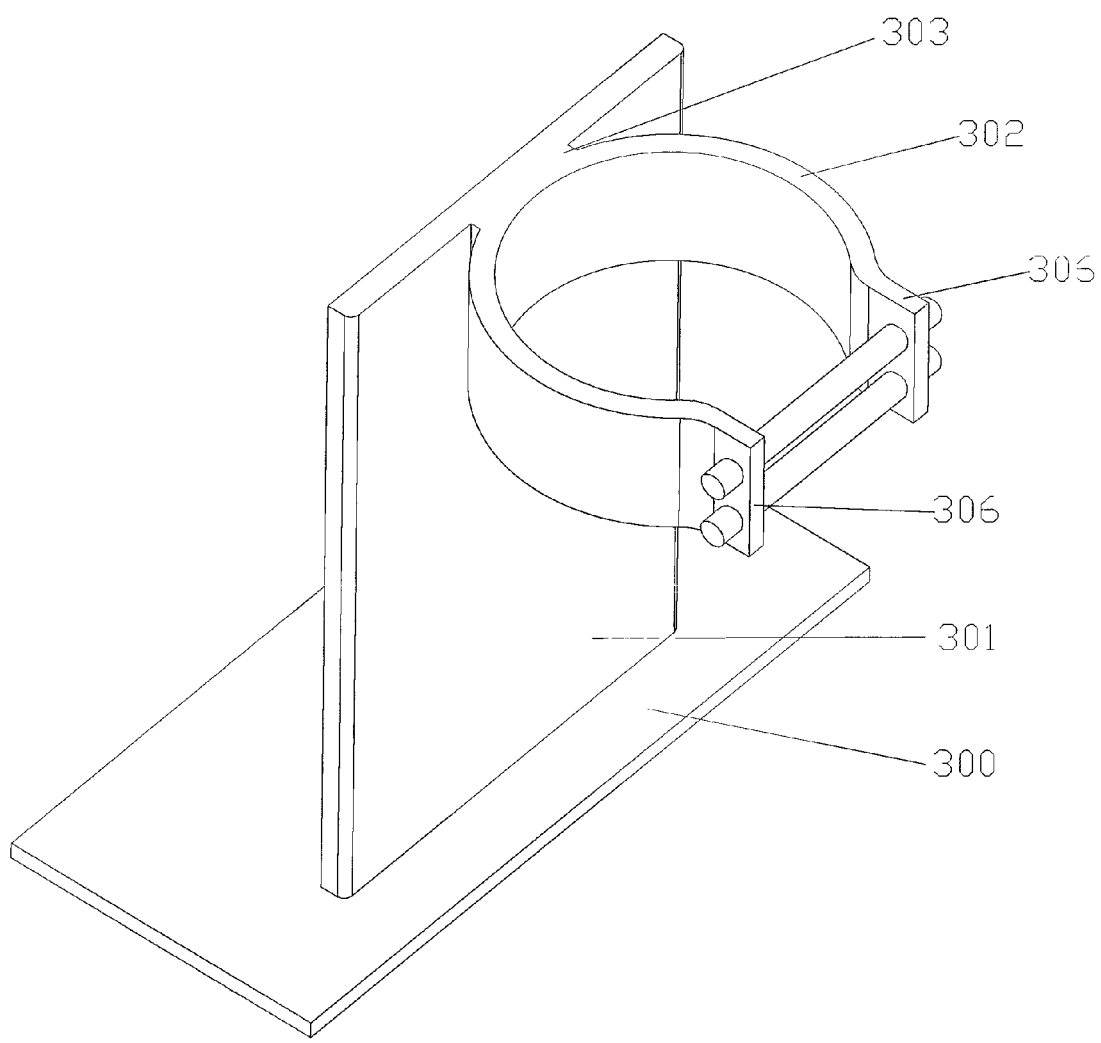
FIG. 9 is a perspective view of a bracket of an automobile air-conditioning system according to another embodiment of the present application.

Reference is made to FIG. 9, which is a perspective view of the bracket according to another embodiment of an automobile air-conditioning system in the present application. Two ends of the gap of the cooling ring 302 are fixedly connected. In this embodiment, the cooling ring 302 having the gap includes two connecting ends 306, the two connecting ends 306 are two ring body extending portions extending outwardly from end portions of the ring body at the gap and arranged opposite to each other, and the two connecting ends 306 are fixedly connected via a bolt. Such cooling ring 302 having the gap may facilitate the installation of the electronic expansion valve 2, and the electronic expansion valve 2 may be mounted more firmly. Since the two ends of the gap of the cooling ring 302 are fixedly connected, the cooling ring and the electronic expansion valve are abutted against each other more tightly, thereby improving the heat transfer efficiency of the cooling ring. The connection manner of the cooling ring 302 in this embodiment is simply an exemplary embodiment, and specific connection manner is not limited to the present embodiment.

In the above embodiments, each of the heat dissipation bridge, the cooling ring, the connecting plate, the base, the first supporting board and the second supporting board is made of heat conduction materials, and is preferably metallic material.

The operating principle of the above embodiments is as follows. When the refrigerating system is working, a surface temperature of the evaporator 1 is a constant low temperature, while the coil 200 of the electronic expansion valve 2 generates heat in operation, and when in summer or under a working environment of high temperature region, the temperature of the electronic expansion valve 2 is very likely to exceed a temperature resistance standard of 120 degree Celsius. A heat dissipation bridge 303 is provided between the evaporator 1 and the electronic expansion valve 2, such that the heat from the electronic expansion valve 2 may be transmitted to the evaporator 1 via the cooling ring 302 and the heat dissipation bridge 303, thereby realizing a cooling effect. Since the heat dissipation bridge 303 is in contact with the evaporator 1, the heat dissipation bridge 303 is cooled by the evaporator 1, thereby further cooling the cooling ring 302, and then heat transfer occurs between the cooling ring 302 and the coil 300 to cool the electronic expansion valve 2. In the present application, the cooling ring 302 and the heat dissipation bridge 303 function to transfer heat and fix the system structure.

Thermal analysis validation is conducted as follows.

In order to verify the actual using effect of the present application, a thermal analysis validation is conducted on the automobile air conditioner according to the embodiment of the present application shown in FIG. 1. The heat dissipation bridge and the cooling ring in each solution in the following experiments are parts made of aluminum alloy material.

First Experiment: a comparison validation between the prior art and the embodiment of the present application shown in FIG. 1

The extreme heat-resistance temperature of the electronic expansion valve in this experiment is set as 120 degree Celsius, and other data are shown in Sheet 1.

| Sheet 1 | |
| --- | --- |
| Type of analysis | Steady state thermal analysis |
| Material | Aluminum alloy |
| Environment temperature | 120 degree Celsius |
| Unit | m |
| Temperature of a heat exchanger | 2 degree Celsius |
| Heat quantity of the electronic expansion valve | 7 W |
| Load | Convection: a vertical convective heat transfer coefficient is 5.7 w/m$^2$gk, and a horizontal convective heat transfer coefficient is 6.15 w/m$^2$gk<br>Thermal load: a surface temperature of the evaporator is 2 degree Celsius<br>Internal heat source: 286720.734 w/m$^3$ |

A comparison experiment is conducted under the above experimental conditions, and according to the analysis result, the highest temperature of the electronic expansion valve in the prior art reaches around 218 degree Celsius when the evaporator is not provided for transmitting heat. And the temperature at the top of the coil of the electronic expansion valve is relatively higher, and the temperature at the bottom of the coil is relatively lower, the above situation is caused because heat generated by the coil in operation is absorbed from the bottom of the coil by the valve body, and there is no heat dissipation approach at the top of the coil.

The analysis result shows that the solution in the embodiment of the present application shown in FIG. 1 has a significant heat dissipation effect. The highest temperature of the electronic expansion valve is around 8 degree Celsius, the temperature field distribution of the valve body of the electronic expansion valve is even, and the temperature difference is about 0.5 degree Celsius, which will not affect the system operation.

Figure 10:
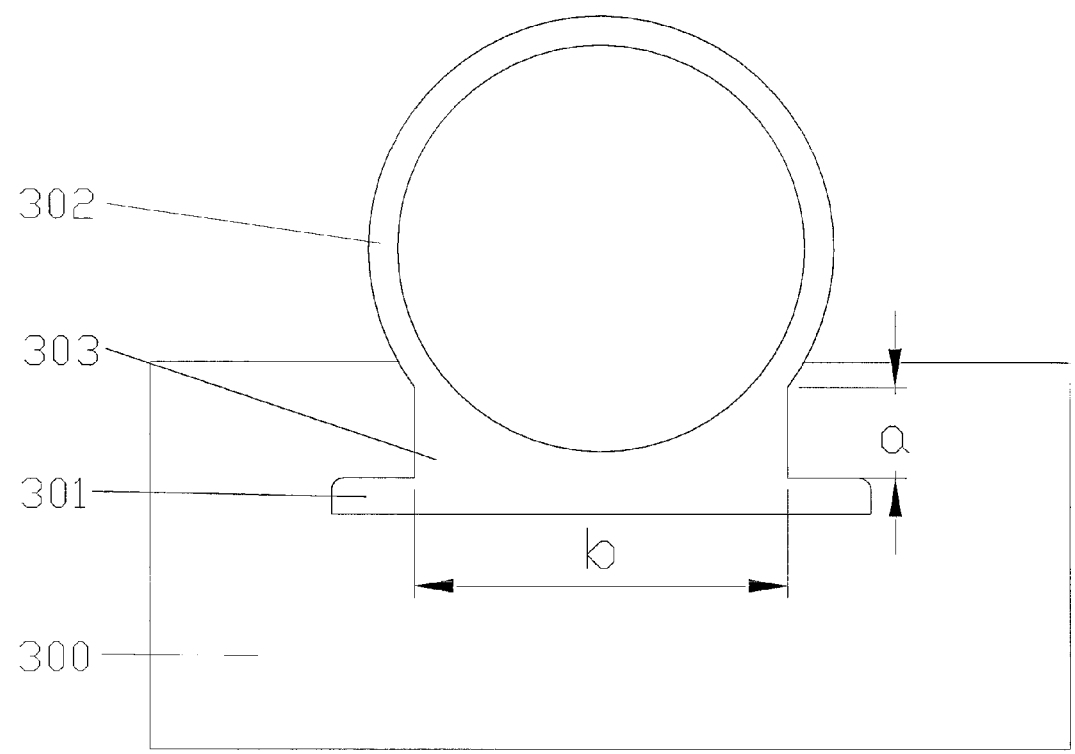
FIG. 10 is a top view of the bracket of the embodiment shown in FIG. 1.
Figure 11:
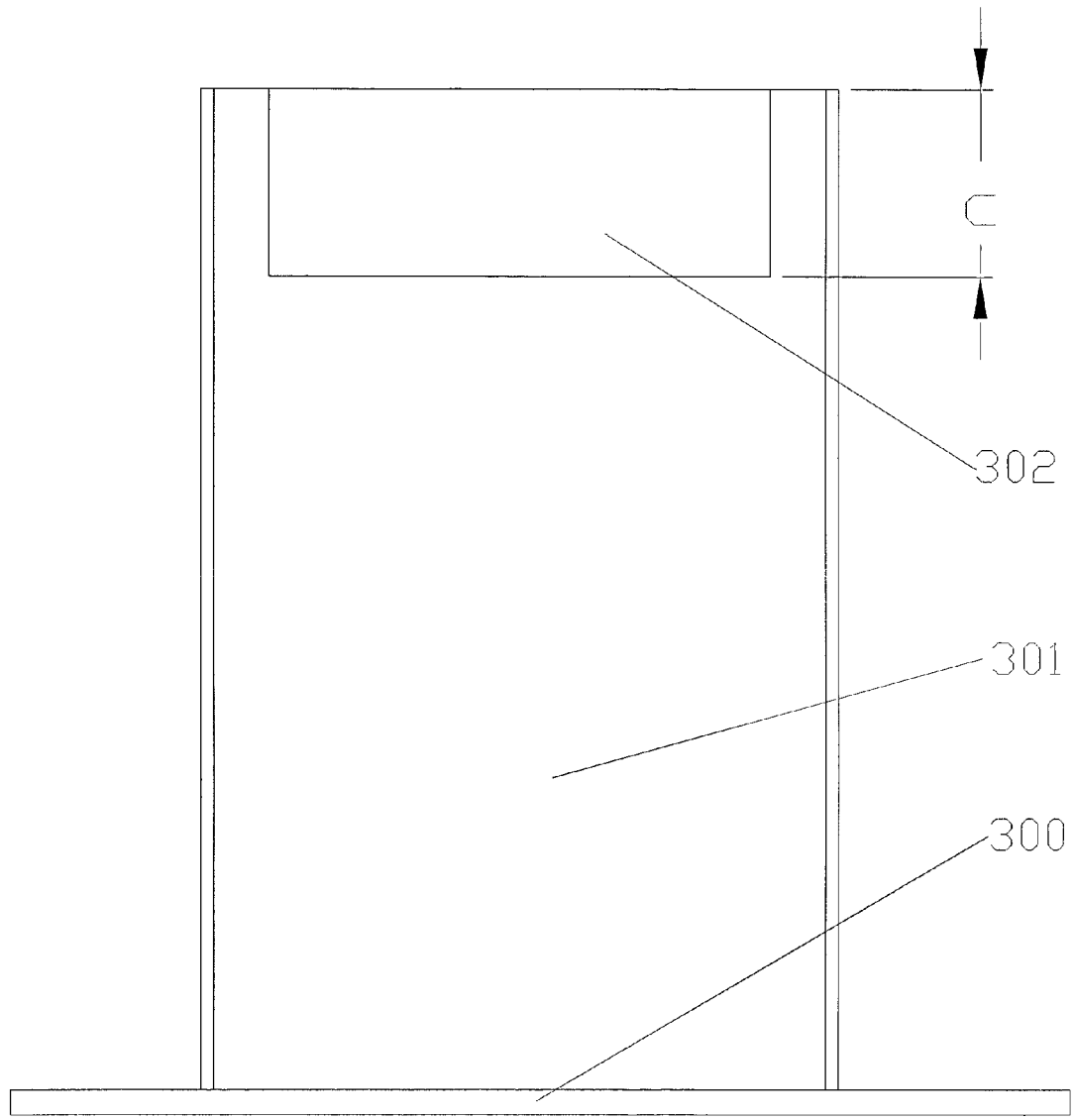
FIG. 11 is a rear view of the bracket of the embodiment shown in FIG. 1.

In the solution of the embodiment of the present application shown in FIG. 1, heat transfer may be controlled by designing and modifying dimensions of the heat dissipation bridge and the cooling ring. Main parameters influencing the heat transfer in the technical solution of the present application are a height of the cooling ring and a width of the heat dissipation bridge. As shown in FIG. 10, which is a top view of the bracket of the embodiment shown in FIG. 1, the heat dissipation bridge has a length a and a width b. As shown in FIG. 11, which is a rear view of the bracket of the embodiment shown in FIG. 1, the cooling ring is a height c. In the following solutions, the cooling ring is set to have the same thickness and diameter, the connecting plate is set to have the same dimension, a distance from a center of the cooling ring to the connecting plate is set be the same, and the same components in each solution has the same material. Thermal analysis validations are conducted, respectively, to analyze influences on the heat dissipation efficiency of the cooling ring caused by the width of the heat dissipation bridge and the height of the cooling ring.

Second Experiment: a comparison validation is conducted with different widths of the heat dissipation bridge in the embodiment oft he present application shown in FIG. 1, wherein the cooling ring has the same dimension, and the height of the cooling ring is 0.015 m. The experimental condition is shown in Sheet 1 and Sheet 2. The width of the heat dissipation bridge in each solution is shown in Sheet 2.

| Sheet 2 | |
| --- | --- |
| Experiment solution | The width of the heat dissipation bridge (m) |
| First Solution | 0.015 |
| Second Solution | 0.02 |
| Third Solution | 0.026 |
| Fourth Solution | 0.032 |

Figure 12:
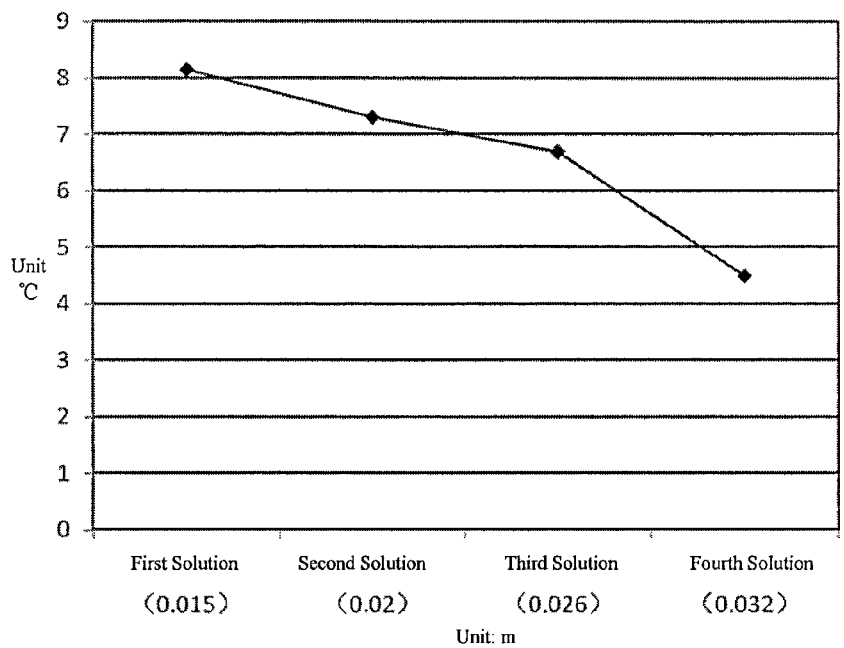
FIG. 12 is a diagram showing highest temperatures of a cooling ring of the embodiment shown in FIG. 1 in a first thermal test.

The experimental results of the four solutions are shown in FIG. 12. In the first solution, the width of the heat dissipation bridge is 0.015 m, and the maximum temperature of the cooling ring is about 8 degree Celsius, which may basically satisfy the cooling requirement of the electronic expansion valve. And as can be seen from FIG. 12, the maximum temperature of the cooling ring decreases as the width of the heat dissipation bridge increases. That is, the larger the width of the heat dissipation bridge, the better the cooling effect.

Third Experiment: a comparison validation is conducted with different heights of the cooling ring in the embodiment of the present application shown in FIG. 1, wherein the heat dissipation bridge in each solution has the same dimension, and the width of the heat dissipation bridge is 0.015 m. The experimental condition is shown in Sheet 1 and Sheet 3. The height of the cooling ring in each solution is shown in FIG. 3.

| Sheet 3 | |
| --- | --- |
| Experiment solution | the height of the cooling ring (m) |
| Fifth Solution | 0.015 |
| Sixth Solution | 0.01 |
| Seventh Solution | 0.005 |
| Eighth Solution | 0.003 |

Figure 13:
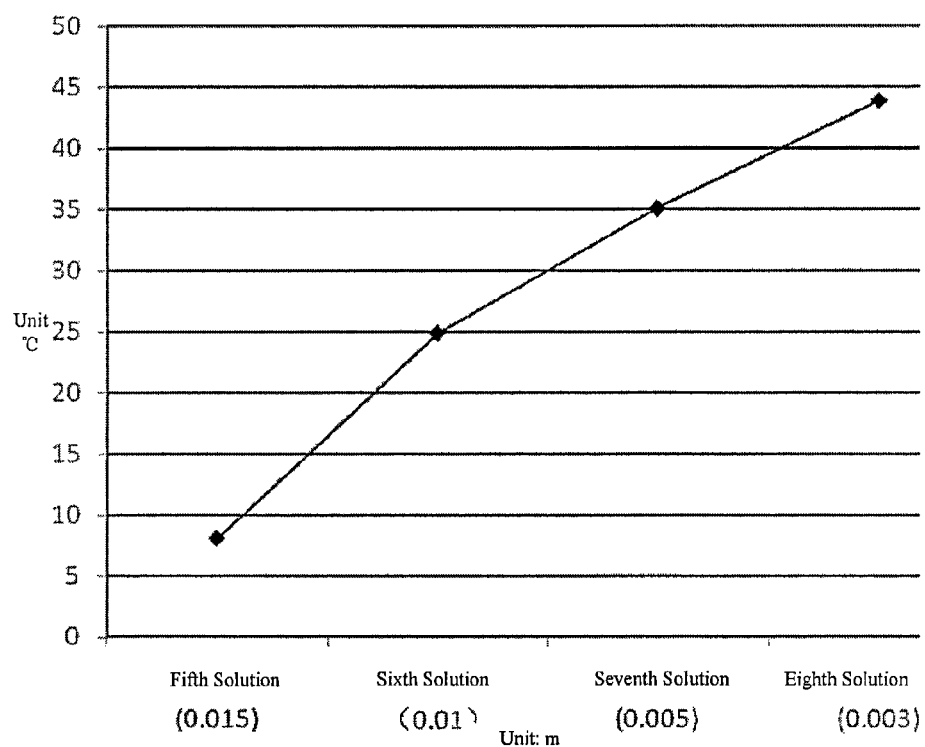
FIG. 13 is a diagram showing highest temperatures of the cooling ring of the embodiment shown in FIG. 1 in a second thermal test.

The experimental results of the four solutions are shown in FIG. 13. In the eighth solution, the height of the cooling ring is 0.003 m, and the maximum temperature of the cooling ring is about 44 degree Celsius, which may basically satisfy the cooling requirement of the electronic expansion valve. As can be seen from FIG. 13, the maximum temperature of the cooling ring increases as the height of the cooling ring decreases. That is, the larger the height of the cooling ring, the better the cooling effect.

As can be concluded from the above verification results, the automobile air-conditioning system in the present application may better solve the problem that the electronic expansion valve is difficult to meet the requirement for temperature resistance of the automobile environment.

The embodiments described hereinabove are only exemplary embodiments of the present application. It should be noted that, for the person skilled in the art, many modifications and improvements may be made to the present application without departing from the principle of the present application. The protection scope of the present application is defined by the accompanying claims.

What is claimed is:

1. An automobile air-conditioning system, comprising: an evaporator and an electronic expansion valve which are communicated with each other via a pipeline, the electronic expansion valve comprising an electromagnetic coil and a valve body, and the electromagnetic coil being fixedly mounted on the valve body, wherein the automobile air-conditioning system further comprises a bracket, the bracket comprises a heat dissipation bridge and a cooling ring, the evaporator is in direct contact with and arranged at a first side of the heat dissipation bridge, the cooling ring is arranged at a second side of the heat dissipating bridge, wherein the second side is opposite to the first side, the heat dissipation bridge and the cooling ring are integrally formed or are fixedly connected, and the electromagnetic coil is arranged in the cooling ring.

2. The automobile air-conditioning system according to claim 1, wherein the heat dissipation bridge and the evaporator are fixedly connected to be in direct contact with one another.

3. The automobile air-conditioning system according to claim 1, wherein the electromagnetic coil is in direct contact with the cooling ring.

4. The automobile air-conditioning system according to claim 3, wherein the electromagnetic coil and the cooling ring are fixedly connected to be in direct contact with one another.

5. The automobile air-conditioning system according to claim 1, wherein the cooling ring has a gap, the cooling ring having the gap comprises two connecting ends, the two connecting ends are two ring body extending portions extending outwardly from end portions of a ring body at the gap and arranged opposite to each other, and the two connecting ends are fixedly connected via a bolt.

6. An automobile air-conditioning system, comprising
an evaporator,
an electronic expansion valve, and
a bracket,
wherein the evaporator and the electronic expansion valve are communicated with each other via a pipeline, the electronic expansion valve comprises a coil and a valve body, and the coil is fixedly mounted on the valve body,
wherein the bracket comprises a heat dissipation bridge and a cooling ring, the evaporator is arranged at a first side of the heat dissipation bridge, the cooling ring is arranged at a second side of the heat dissipation bridge, wherein the second side is opposite to the first side, the heat dissipation bridge and the cooling ring are integrally formed or are fixedly connected, and the coil is arranged in the cooling ring,
wherein the bracket further comprises a connecting plate, the connecting plate is arranged between the evaporator and the first side of the heat dissipation bridge, the heat dissipation bridge is arranged at a first surface of the connecting plate close to the electronic expansion valve, the evaporator being in direct contact with a second surface of the connecting plate, wherein the second surface of the connecting plate is opposite to the first surface of the connecting plate, and the heat dissipation bridge and the connecting plate are integrally formed or are fixedly connected.

7. The automobile air-conditioning system according to claim 6, wherein a cover configured to enclose the electromagnetic coil is arranged on the cooling ring, and the cover and the cooling ring are integrally formed or are fixedly connected.

8. The automobile air-conditioning system according to claim 7, wherein the cover has no opening and completely encloses a top portion of the electromagnetic coil, or the cover has an opening and partially encloses a top portion of the electromagnetic coil.

9. The automobile air-conditioning system according to claim 6, wherein the cooling ring is of a complete ring body structure.

10. The automobile air-conditioning system according to claim 6, wherein the second surface of the connecting plate and the evaporator are fixedly connected to be in direct contact with one another.

11. The automobile air-conditioning system according to claim 10, wherein the second surface of the connecting plate is fixedly connected to the evaporator by welding, and a welding surface is an entire contacting surface between the connecting plate and the evaporator, or a contacting surface between the evaporator and a part corresponding to the heat dissipation bridge, of the connecting plate at the second surface of the connecting plate.

12. The automobile air-conditioning system according to claim 6, wherein the bracket further comprises a base, the base is horizontally arranged at a bottom of the connecting plate, the connecting plate and the base are integrally formed or are fixedly connected, the base is fixedly mounted in the automobile, and the evaporator and the electronic expansion valve are, respectively, located at two sides above the base.

13. The automobile air-conditioning system according to claim 12, wherein the evaporator is directly fixed on one side of an upper surface of the base, and the valve body of the electronic expansion valve is directly fixed on the other side of the upper surface of the base.

14. The automobile air-conditioning system according to claim 12, wherein the bracket further comprises a first supporting board, the first supporting board is fixedly mounted on the second surface of the connecting plate, and the evaporator is fixedly mounted on the first supporting board.

15. The automobile air-conditioning system according to claim 14, wherein the bracket further comprises a second supporting board, the second supporting board is fixedly mounted on the first surface of the connecting plate, and the valve body of the electronic expansion valve is fixedly mounted on the second supporting board.

16. The automobile air-conditioning system according to claim 12, wherein the bracket further comprises a second supporting board, the second supporting board is fixedly mounted on the first surface of the connecting plate, and the valve body of the electronic expansion valve is fixedly mounted on the second supporting board.

* * * * *